D. E. Mitchell,
Horse Power.
No. 104,484.   Patented June 21, 1870.
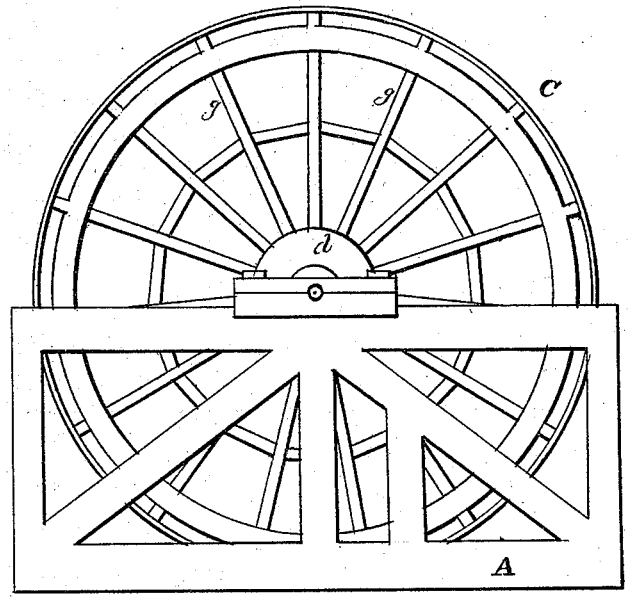
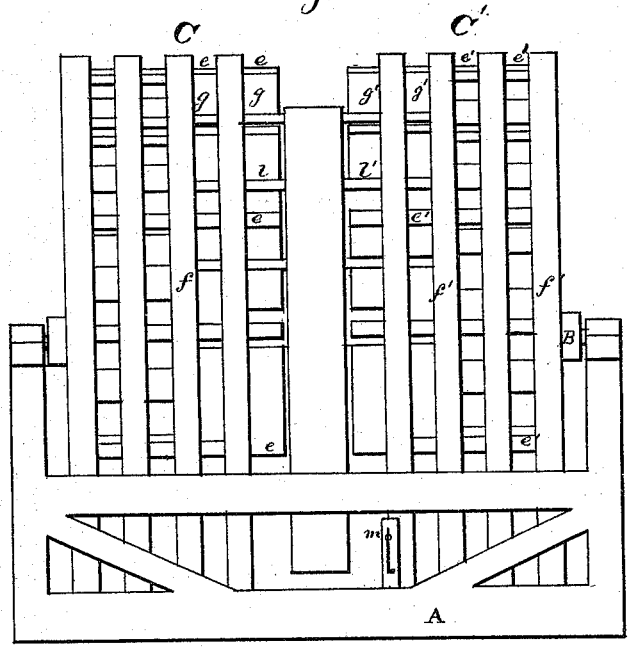
Witnesses:  
J. W. Hester  
H. A. Daniels
D. E. Mitchell — Inventor, by  
Chas. D. Whitman Attorney 2 Sheets, Sheet 2.

D. E. Mitchell,
Horse Power.

No. 104,484. Patented June 21, 1870.

Witnesses,
J. W. Mester
H. A. Daniels.

D. E. Mitchell, Inventor, by
Chas. S. Whitman, Attorney.

UNITED STATES PATENT OFFICE.

DAVID E. MITCHELL, OF RURAL DALE, OHIO.

IMPROVED DOUBLE-LEVER MASTER-WHEEL.

Specification forming part of Letters Patent No. 104,484, dated June 21, 1870.

*To all whom it may concern:*

Be it known that I, DAVID E. MITCHELL, of Rural Dale, in the county of Muskingum, and in the State of Ohio, have invented a new and useful Improvement in Double-Lever Master-Wheels; and I do hereby declare that the following description, taken in connection with the accompanying drawings, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of horse-powers in which the tread is situated within a revolving wheel; and the nature thereof consists in certain modifications in the details and improvements in the construction of the same, hereinafter described and shown.

Figure 3:
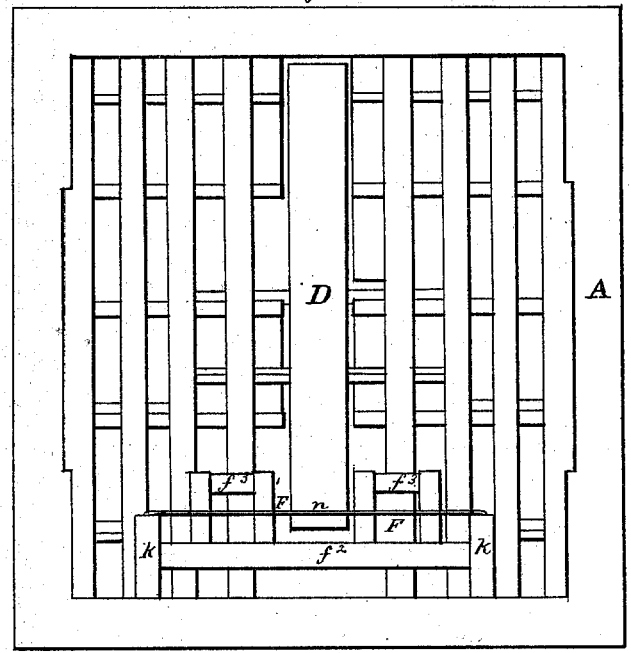
Figure 4:
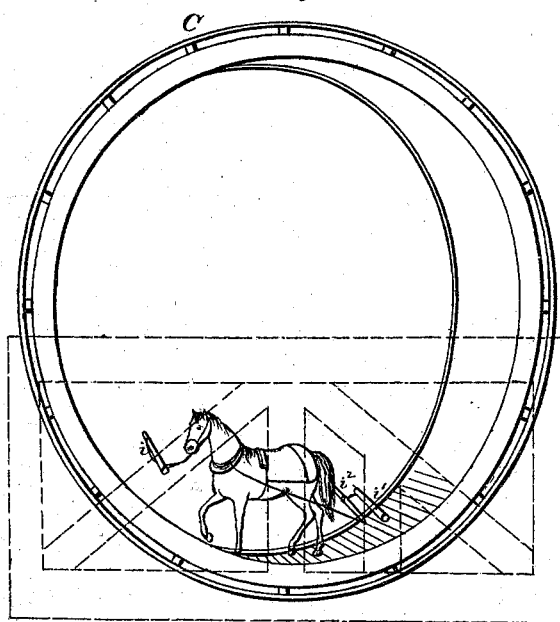

In the accompanying drawings, which illustrate my invention and form a part of the specification thereof, in which corresponding parts are represented by similar letters, Figure 1 represents a side elevation of the wheel. Fig. 2, a front elevation thereof; Fig. 3, a bottom view, and Fig. 4 a side view in perspective.

The construction, operation, and relative arrangement of the component parts of my invention are as follows, to wit: The frame A, upon which the wheel rests, is constructed of beams and joists firmly secured together in the ordinary manner, and may be mounted on trucks or wheels in such a manner as to be moved from place to place.

The main shaft B has its bearings in journal-boxes secured to the upper beams of the frame. Upon the shaft B are the two tread-wheels C C', which are secured thereto by means of the stationary hubs or cylinders $d$, into which the spokes of said wheels enter, and are connected together by the connecting bars or joists $l\ l'$. These wheels are of such a width and provided with a floor of sufficient thickness as to allow the animals operating them to work freely and with perfect safety. Secured transversely to the peripheries of said wheels, as seen in Figs. 2 and 3, for the purpose of bracing and strengthening the flooring of the same, and projecting a short distance over the inner edges thereof, to receive the outer looped ends of the spokes of the wheels, are a series of joists or braces, $e\ e'$. Extending around the said wheels C C', and firmly screwed or otherwise fastened to the upper sides of the joists $e\ e'$, are the peripherical braces or boards $f f'$, placed at suitable distances apart.

The series of braces or supports $l\ l'$, placed transversely across the space between the wheels C C', and around which the drum D is fastened in the ordinary way, are secured at each end, a short distance below the peripheries of the said wheels, to the spokes $g\ g'$ thereof.

The drum D, around which the belt connected with the machinery to be put in motion is to be passed, is less in diameter than the wheels C C', so as to leave a space between the inner sides of the said wheels sufficiently deep to retain its belt in position while in motion. Within the said wheels C C', and secured at one of their ends to the inner side of the joists of the frame A, are the horizontal bars or poles $i\ i'$, to one pair, $i'$, of which are attached or linked the single-trees $i^4$, by means of which, with the necessary harness, the horses may be hitched within the wheels, so as to operate them.

F designates a brake, which consists of the piece $f^2$, pivoted to the inner sides of the horizontal projections $k$, fastened to one of the lower beams or joists of the frame A, and stops $f^3$, constructed as shown in Fig. 3, and secured to and at right angles with the cross-piece $f^2$. To the outer ends of the projections $k$ is secured at each end the metallic bar $n$, which is situated on the lower side of the stops of the brake, so as to retain them in a horizontal plane. The brake F is operated by means of a lever, $m$, secured to the cross-piece $f^2$, as seen in Fig. 2.

The above-described mode of moving the machine may be facilitated by simply fastening one end of a rope or belt to the drum in the proper manner, and the other end to a tree or stump, and starting the horses in the wheels, putting the machine in motion, thereby causing the rope or belt to be wound around the drum and the machine moved forward.

Having thus described the construction, operation, and relative arrangement of the component parts of my invention, I will indicate what I claim and desire to secure by Letters Patent in the following clause:

A double lever-wheel consisting of the tread-wheels C C', secured together by the connecting bars or joists l l', and located upon the shaft B, having its bearings in journal-boxes fastened to the movable frame A and drum D, so constructed as to leave a space of sufficient depth between the inner sides of the said wheels C C' as to retain its belt in position while in motion, in combination with the brake F, constructed as specified, and operated by the lever m, all arranged and operating substantially as described.

In testimony that I claim the foregoing I have hereunto set my hand this 23d day of March, 1870.

D. E. MITCHELL.

Witnesses:
ELEANOR ANDERSON,
COSTER BETZ.